L. B. JONES.
ELECTRIC DISTRIBUTION SYSTEM.
APPLICATION FILED MAR. 15, 1913.
1,081,749.
Patented Dec. 16, 1913.
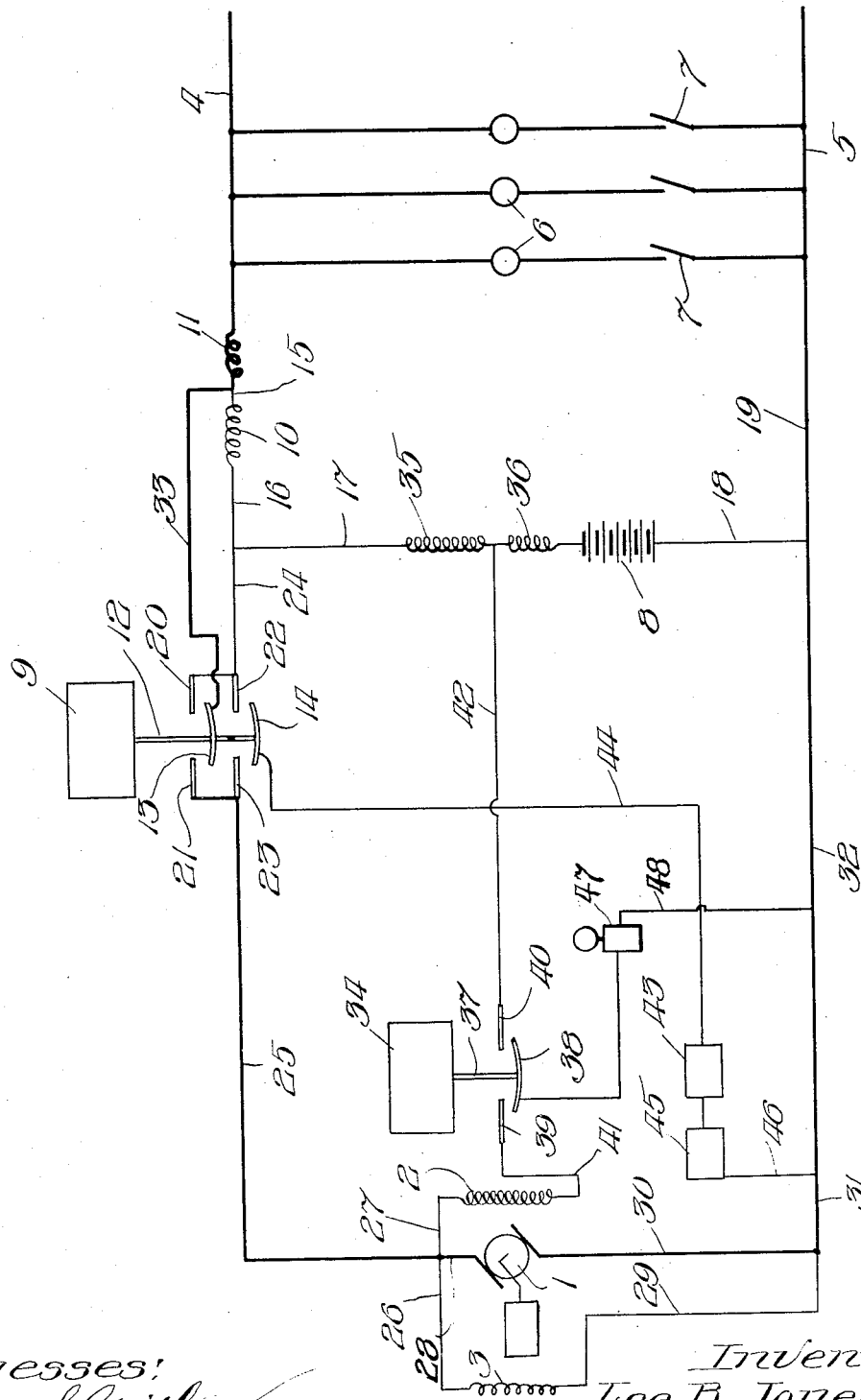

UNITED STATES PATENT OFFICE.

LEE B. JONES, OF KANSAS CITY, MISSOURI.

ELECTRIC DISTRIBUTION SYSTEM.

1,081,749. Specification of Letters Patent. Patented Dec. 16, 1913.

Application filed March 15, 1913. Serial No. 754,518.

*To all whom it may concern:*

Be it known that I, LEE B. JONES, a citizen of the United States, residing at Kansas City, in the county of Jackson and State of Missouri, have invented certain new and useful Improvements in Electric Distribution Systems, of which the following is a specification.

This invention relates to a new system for the transmission and distribution of electrical energy.

The invention relates particularly to a system in which controlling mechanisms of suitable nature are provided, whereby whenever a demand for current is created at any point on the system the prime mover which drives the electric generator will be brought into motion, and will continue to run under its own power to deliver current to the system; and whereby said prime mover will continue thus to operate or function as long as the demand for current exists, but as soon as said demand ceases the prime mover will stop and come to rest. In other words, the system is one in which the starting and stopping of the prime mover is dependent upon whether or not there is a demand for current on the system. Such an arrangement is of peculiar applicability to individual lighting or distribution systems. For example, it is peculiarly adapted for use on farms, and the like, where it is necessary to use a generating unit, but where, on account of the size of the unit or its location, or on account of the inability to secure adequate and proper skilled labor for its supervision, it is undesirable to use the ordinary generating unit which must be manually started and stopped.

The main object of the invention is to associate mechanisms, such as relays, or the like, with a generating unit and electric distribution system in such a way that as soon as a demand is created for current on the distribution system, the generating unit will commence to function in the proper manner and will continue so to function as long as the demand for current continues. Also to so arrange such a system as to make it peculiarly adaptable for use in connection with generating units in which the prime mover is an internal combustion engine of suitable characteristics.

Another object is to so combine with the system a suitable form of relay or governor, whereby the sparking mechanism, and compression of the internal combustion engine, will be so controlled as to permit the generating unit to start and come up to speed in the quickest and smoothest manner possible and with the least consumption of energy, thereby making the starting unit extremely responsive and prompt in its action in responding to the demands for current from the distribution system.

Other objects and uses will appear from a detailed description of the invention which consists in the features of construction and combinations of elements hereinafter described and claimed.

In the drawing, I have illustrated diagrammatically one set of mechanisms and connections for accomplishing all of the aforementioned as well as other results. The prime mover illustrated in the present case is an internal combustion engine, and the dynamo of the generating unit is shown as being a direct current generator. The generator comprises the armature 1 having a series field winding 2 and a shunt field winding 3. In the system illustrated in the drawing, the electric distribution is effected by what is known as a simple two-wire direct current distribution, and for this purpose there are provided the mains 4 and 5, between which the load comprising, for example, a series of lights 6 is connected. Each light or load is illustrated as being controlled by its individual switch or button 7. When the system is in operation the generator supplies its current to the mains 4 and 5.

It is desired to so arrange and combine suitable mechanisms with the generating unit and distribution mains as to bring the generating unit up to speed when a demand for load is created at any point on the distribution system. For this purpose, I have provided a storage battery 8 of comparatively small ampere-hour capacity, the object and function of which battery is to start the generating unit and bring it into motion when the demand for current arises. In this connection, I have provided a suitable starting mechanism which will turn the prime mover over the necessary number of times to bring it into action, and for this purpose the battery 8 supplies current to such starting mechanism as soon as the demand for current is created. In the particular arrangement illustrated, I have availed myself of the characteristics of the dynamo of the generating unit, and I use the same for starting purposes. To the above end, I have provided a relay 9 within which are mounted the coils 10 and 11. Although in the drawing I have shown these coils as located outside of the box of the relay 9, still it will be understood that, as a matter of fact, they are set within said box and act upon the relay plunger 12 carrying the leaf contacts 13 and 14. Although these contacts are both carried by the same plunger, they are insulated from each other for reasons to be hereinafter explained. The coil 10 is of comparatively light wire and of comparatively large number of turns, so that, even when carrying a small current, it will develop a considerable magnetomotive force, sufficient in fact to lift the plunger 12 with its contacts 13 and 14. On the other hand, the coil 11 is of comparatively heavy wire and may have but few turns, so that even when carrying a comparatively heavy current it will exert only a small magnetomotive force, just sufficient in fact to retain the plunger 12 with its contacts 13 and 14 in raised position when any load is being drawn from the mains 4 and 5. The two coils 10 and 11 are connected in series by the lead 15, the coil 11 being connected to the main 4. The coil 10 connects by the leads 16 and 17 and through the coils of another relay to one side of the battery 8. The other side of the battery connects by means of the leads 18 and 19 to the other main 5, so that as soon as a circuit is closed between the mains, a local current will flow around the circuit from the battery through the leads 18 and 19 to the main 5, through a switch 7 and load 6 to the main 4, through the coil 11, lead 15, coil 10, leads 16 and 17, and the coils of the other relay back to the battery. This current will energize the coils 10 and 11 of the relay 9, and by reason of the comparatively large magnetomotive force developed in the coil 10, the plunger 12 will be raised thereby bringing the contact 13 into operative position. The contact 13 will engage the contacts 20 and 21, while the contact 14 will engage the contacts 22 and 23. The contact 20 connects by a lead 24 to the lead 17 and the contact 21 connects by a lead 25 to one terminal of the dynamo. The shunt and series coils of the dynamo connect to one of its terminals by the leads 26 and 27 respectively and the armature connects to said terminal by the lead 28. The shunt coil and armature connect to the other terminal of the dynamo by the leads 29 and 30 respectively, and said terminal connects by the leads 31 and 32 with the leads 18 and 19. From the above, it will be seen that as soon as the relay raises its plunger in the manner just described, a current will flow around the circuit from the battery through the leads 18, 32, and 31 to one terminal of the dynamo, thence through the armature and shunt coil in parallel to the other terminal of the dynamo and thence through the lead 25, contacts 23, 14, and 22, and lead 24, through the coils of the other relay, and back to the battery. This current will serve to some degree to excite the shunt coil of the dynamo. The contact 13 connects by a lead 33 to the lead 15, so that as soon as the plunger 12 rises, the coil 10 of the relay 9 will be shunted or cut out of circuit, but the magnetomotive force of the coil 11 which remains in circuit will be sufficient to retain the plunger 12 and contacts 13 and 14 in raised position as long as current flows between the mains 4 and 5.

There is provided a relay 34 having the coils 35 and 36. Although these coils are shown in the drawing as set away from the box of the relay 34, still it will be understood that, as a matter of fact, they are located within said box, and act upon the plunger 37 carrying the contact 38. When this contact 38 is raised it engages the contacts 39 and 40 to close a circuit. Now the coil 35 is of comparatively small wire and of comparatively large number of turns, so that for a given current, a comparatively large magnetomotive force is developed by it, sufficient in fact to raise the plunger 37 carrying the contact 38. On the other hand, the coil 36 is of comparatively heavy wire and of small number of turns, so that even when carrying a comparatively heavy current, it only develops enough magnetomotive force to sustain the plunger 37 with the contact 38 in raised position. Under ordinary circumstances, the closing of the comparatively light load between the mains 4 and 5 would not cause a sufficient flow of current around the local battery circuit, to generate enough magnetomotive force in the coils 35 and 36 to cause the same to raise the plunger 37. However, by reason of the simultaneous energizing of the coils 10 and 11 of the relay 9, and the consequent raising of the plunger 12 with the contact 14 and the consequent closing of a local circuit through the generator armature and shunt field in parallel, a sufficient additional amount of current will be drawn around this local circuit to thereupon energize the coils 35 and 36 to an extent sufficient to cause the plunger 37 with its contact 38 to be raised and thus establish a connection between the contacts 39 and 40. The contact 39 connects by a lead 41 with the other side of the series coil 2 of the dynamo, and the contact 40 connects by means of a lead 42 to a point between the coils 35 and 36. Now it will be seen that the instant the relay 34 acts to raise its plunger and contact 38, a local circuit will be closed from the battery through the leads 18, 32, and 31 to one terminal of the dynamo, through the lead 30 to the armature 1, through the lead 28 to the other terminal, through the lead 27 to the series coil, through the lead 41 to the contacts 39, 38, and 40 through the lead 42, to the coil 36, and finally back to the battery. This local circuit will place the armature and series field of the dynamo in series with each other, energizing the series field in such a direction as to turn the dynamo over as a motor in the proper direction, and thereby cause the prime mover to commence to rotate and come up to speed. As the speed of the dynamo continues to increase, the current around the last mentioned local circuit will decrease according to the well known characteristics of the series motor, but the magnetomotive force of the coil 36 of the relay 34 will remain sufficient to maintain the plunger 37 in raised position for the time being. When the generating unit finally commences to operate under its own power, its shunt field 3 will build up in a proper direction to cause the generator to generate an electromotive force which will buck the starting current just considered, so that the latter will rapidly fall until finally the current flowing through the local circuit, including the series coil, will become so small that the magnetomotive force of the coil 36 will not be sufficient to retain the plunger 37 in raised position, and the latter will drop, thereby opening the starting circuit. However, as long as any current is flowing between the mains 4 and 5, the coil 11 of the relay 9 will remain energized to retain the plunger 12 in raised position, and thereby maintain the circuit between the contacts 21 and 13 closed, so that the dynamo will be able to deliver current directly to the mains as a shunt dynamo. Thus the load circuit when operating normally will be as follows: from the armature through the leads 30, 31, 32, and 19 to the main 5, through the load to the main 4, through the coil 11 of the relay 9, through the lead 33 to the contact 13, to the contact 21, through the leads 25 and 28 to the other side of the armature.

When the generating unit is operating at normal speed, the potential between the leads 25 and 32 will be equal to or slightly greater than that of the battery 8, so that at such times the current flowing through the battery by means of the leads 17 and 18 will become zero, or will even be reversed, depending upon the amount of previous discharge or condition of the battery, so it will be seen that the battery will be automatically recharged if necessary to compensate or make up for the energy which was drawn off during the starting operation. It will, however, be seen that, during the normal operation when the generating unit is operating at full speed, the battery is practically idle, the current for the load coming directly from the generator.

With the arrangement as thus far illustrated and described, the system will be effectual for the purpose of starting the generating unit and bringing it up to speed, and for automatically cutting out the starting circuit after full speed has been attained. It is, however, desired to so arrange the system that as soon as the demand for current between the mains 4 and 5 ceases the generating unit will stop functioning and will come to rest, thereby saving fuel, lubricating oil, and wear and tear on the parts. In order to effect this result, I make use of the contact 14 carried by the plunger 12 of the relay 9. This contact serves to control the flow of current to the igniter, and as long as the contact stands in raised position, current is supplied to the igniter, but when the contact is dropped by reason of the non-energization of the coil 11, which will take place as soon as the load is cut off, the ignition circuit will be broken, thereby stopping the prime mover. In the arrangement illustrated, the igniter is shown at the point 43. It connects by a lead 44 with the contact 14, and through a centrifugal governor 45 and lead 46 to the lead 32. Therefore, as soon as the centrifugal governor 45 throws its contact into closed position, and as long as the contact 14 is held in raised position, the current will be supplied to the igniter 43 for running the engine. As soon as the load is cut off from between the mains, the plunger 12 will fall, thereby opening the ignition circuit and stopping the engine.

The centrifugal governor 45 is used for the purpose of closing the ignition circuit as soon as the engine reaches a desired speed, as there is a certain class of internal combustion engines which will not start properly, unless the ignition circuit is left open until the desired speed is reached. However, in the present arrangement, although the contact 14 will rise in the first instance, the ignition circuit will not be closed until the engine reaches a predetermined speed as controlled by the centrifugal governor 45. This governor may also be so arranged as to retain the compression valves of the cylinders open until the desired speed of the engine is reached, thus making it much easier to start the generating unit than would be the case if it were necessary to start against the compression.

It will be seen that when the system herein described comes into normal operation the only unusual resistance between the generator and the mains is the resistance of the coil 11. Inasmuch as this coil is made from heavy wire and has but few turns, its resistance is very small, and in fact practically negligible. It will also be seen that during the starting operation the only unusual resistance encountered by the starting current from the battery is the resistance of the coil 36. This coil is also of heavy wire and few turns, so that the loss of energy of the starting current will be extremely small.

It was previously stated that, owing to the increase in the speed of the generating unit, the starting current will rapidly fall until it reaches such a small value that the magnetomotive force of the coil 36 will be insufficient to retain the plunger 37 of the relay 34 in raised position, and consequently such relay will fall and thus open the starting circuit. It will be seen that the fall of current through the coil 36 will be further accelerated by the rise of the voltage of the generator itself, so that in fact the current through the coils 36 and 35 will fall to zero and may subsequently be reversed. At any rate the voltage generated by the generator itself will cause such a drop of the starting current as to cause the relay 34 to release.

In the system herein disclosed I have provided means for giving an indication or signal as long as a current is flowing in the starting circuit, so that in case the starting circuit should remain closed for an abnormally long time, the operator or user will be informed that an abnormal condition exists. For example, in case the gasolene supply should become exhausted, so that the engine would fail to pick up and run under its own power, the prolonged duration of the alarm or indication would give a warning and notice of such fact. Such an alarm or indication may be influenced in any desired manner by the presence of a current in the starting circuit, or the alarm or indication may be given by the operation of the starting relay 34. In the particular arrangement illustrated, I have adopted the latter provision, and have made such provision that, as long as the starting relay holds its plunger 37 in raised position to close the starting circuit, the signal will be actuated. The particular arrangement illustrated comprises a bell or the like 47 connected by a lead 48 with the lead 32 on the one hand and with the movable contact 38 of the relay 34 on the other hand. Obviously as long as said relay holds its contact in elevated position, the bell or other alarm device will have its terminals connected across the battery and will be actuated by current from the same.

Although in the particular arrangement illustrated I have shown a bell connected in shunt with the dynamo starting circuit, still I do not limit myself to the arrangement illustrated except as called for in the claims, but I contemplate within the scope of my invention, as far as this feature is concerned, the use of any suitable form of signal, whether visible, or audible, or otherwise, which will be actuated as long as current continues to flow through the starting circuit.

A study of the herein described system will show that, in order to turn the generating unit over in the proper direction, its series and parallel windings should oppose each other. However, in view of the fact that the series winding is not in operation during the normal running of the system, it is seen that this feature is not a disadvantage because at such times the generator is operating strictly as a shunt-wound generator. For that matter two-series windings might be used if desired, one of which could be placed in the lead 25 so as to carry only the load current delivered to the mains, and the other series winding being used only for starting purposes.

Although in the present case I have illustrated a particular arrangement of relays and other mechanisms for causing the generating unit to be started and brought into action, and to be stopped according to whether or not a load is demanded from between the mains, still I do not in any wise restrict myself to the arrangements illustrated and described, except as may be called for in the claims, but I include within the scope of my invention any arrangement of relays or other mechanisms and suitable starting devices, whereby the generating unit will be brought up to speed as soon as a demand is created for the current, and whereby the generating unit will cease to function when that demand ceases.

I claim:

1. In an electric distribution system, the combination with a generating unit comprising a dynamo electric machine and prime mover, and distributing mains, of a storage battery, a relay for connecting the same to the dynamo electric machine for the purpose of running the same as a motor for starting purposes, and a connection between the relay and a distributing main for the purpose of energizing the relay with current which flows between the distributing mains when a circuit is closed between the distributing mains, substantially as described.

2. In an electric distribution system, the combination with a generating unit comprising a dynamo electric machine and a prime mover, and distributing mains, of a source of electrical supply, a relay for connecting the same to the dynamo electric machine to run the latter as a motor for starting purposes, and a connection for delivering current momentarily to the distributing mains from the source of electrical supply, said relay being operable under the influence of said momentary current for the purpose of connecting the dynamo electric machine to the source of electrical supply for starting purposes, substantially as described.

3. In an electric distribution system, the combination with a generating unit comprising a dynamo electric machine and prime mover, and distributing mains, of a storage battery, a relay having a coil in series with a distributing main, a pair of contacts in said relay for connecting one terminal of the dynamo electric machine to said main, another relay having one of its coils connected between one terminal of the battery and the first mentioned distributing main, a connection between the other terminal of the battery and the other distributing main, said last mentioned relay having a pair of electric contacts, a circuit including the battery, dynamo electric machine, and said contacts, and a second coil in the last mentioned relay interposed in the circuit, including the dynamo electric machine and battery, whereby closing a circuit between the mains causes a flow of current from the battery through the coils of both relays to connect the first mentioned main to the dynamo electric machine and to close the circuit, including the dynamo electric machine and battery, substantially as described.

4. In an electric distribution system, the combination with a generating unit, including a prime mover and a dynamo electric machine, and a pair of distributing mains, of a storage battery, a starting relay, a coil in said relay interposed between one terminal of the battery and a distributing main, a connection from the other terminal of the battery to the other distributing main, and a starting circuit, including the dynamo electric machine, battery, and contacts of said relay, whereby when a circuit is closed between the mains, a local current flows from the battery through said relay coil to energize the relay to thereby close the starting circuit, substantially as described.

5. In an electric distribution system, the combination with a generating unit comprising a prime mover and a dynamo electric machine, and a pair of distributing mains, of a storage battery, a starting relay, connections for establishing a circuit, including the dynamo electric machine, storage battery, and contacts of the starting relay, a main line relay, connections for establishing communication between a distributing main and a terminal of the dynamo electric machine, and including contacts of the main line relay, a connection between one distributing main and one terminal of the battery, a coil of the starting relay interposed between the other terminal of the battery and the other distributing main, whereby the closing of a circuit between the distributing mains causes the starting relay to be energized to deliver starting current to the dynamo electric machine, and a coil of the main line relay interposed between the main line and the battery, whereby when a circuit is closed between the distributing mains current is delivered from the battery through said coil to energize the main line relay for the purpose of connecting the distributing main to the dynamo electric machine, substantially as described.

6. In an electric distribution system, the combination with a generating unit and distribution mains, of starting means for bringing the generating unit into operation, means for actuating said starting means when a circuit is closed between the distributing mains, and signaling means for indicating the operation of the starting means, substantially as described.

7. In an electric distribution system, the combination with a generating unit and distributing mains, of means for starting the generating unit when a circuit is closed between the distributing mains, and means for indicating the actuation of the starting means, substantially as described.

8. In an electric distribution system, the combination with a generating unit, including a dynamo electric machine and means for driving the same, and electric distribution mains, of a source of electricity, means for connecting said source of electricity to the dynamo electric machine, means for actuating said connecting means when a circuit is closed between the distributing mains, and means for indicating the actuation of the connecting means, substantially as described.

9. In an electric distribution system, the combination with a generating unit, including a dynamo electric machine and means for driving the same, and electric distribution mains, of a storage battery, means for connecting the storage battery to the dynamo electric machine for starting purposes, means for actuating the connecting means when a circuit is closed between the distributing mains, and a signal operable under the influence of the connecting means for indicating the actuation thereof, substantially as described.

10. In an electric distribution system, the combination with a generating unit, including a dynamo electric machine and means for driving the same, and electric distribution mains, of a storage battery, means for connecting the same to the dynamo electric machine for starting purposes when a circuit is closed between the distributing mains, and a signaling device operable under the influence of the connecting means to indicate the actuation thereof, substantially as described.

11. In an electric distribution system, the combination with a generating unit, including a dynamo electric machine and means for driving the same, and electric distribution mains, of a source of electrical supply, a switch for connecting the same to the dynamo electric machine for starting purposes, means for actuating said switch when a circuit is closed between the distributing mains, and a signaling device connected to the switch and operable during the period of closure of the switch, substantially as described.

12. In an electric distribution system, the combination with a generating unit, including a dynamo electric machine and means for driving the same, and electric distribution mains, of a storage battery, a switch for connecting the same to the dynamo electric machine for starting purposes, means for actuating said switch to connect the battery to the dynamo electric machine for starting purposes when a circuit is closed between the distributing mains, and a signaling device actuated by the closing of the switch and operable during the interval of closure of the switch, substantially as described.

13. In an electric distribution system, the combination with a generating unit, including a dynamo electric machine having a series winding and means for driving the same, and electric distribution mains, of a source of electrical supply, and means for connecting the same to the dynamo electric machine, including the series winding to operate the same as a series motor for starting purposes when a circuit is closed between the distributing mains, substantially as described.

14. In an electric distribution system, the combination with a generating unit, including a dynamo electric machine having a series winding and means for driving the same, and electric distribution mains, of a source of electrical supply, means for connecting the same to the dynamo electric machine, including a series winding for starting purposes, and means for actuating the connecting means when a circuit is closed between the distributing mains, substantially as described.

15. In an electric distribution system, the combination with a generating unit, including a dynamo electric machine having a series winding and a shunt winding, and means for driving the same, and electric distribution mains, of a source of electrical supply, means for closing a circuit, including the dynamo electric machine armature, series winding, and source of electrical supply, and means for actuating said circuit closing means for starting purposes when a circuit is closed between the distributing mains, substantially as described.

16. In an electric distribution system, the combination with a generating unit, including a dynamo electric machine having a series winding and a shunt winding, and means for driving the same, and electric distribution mains, of a storage battery, means for closing a circuit, including the armature and series winding of the dynamo electric machine and the storage battery, and means for actuating said circuit closing means for starting purposes when a circuit is closed between the distributing mains, substantially as described.

17. In an electric distribution system, the combination with a generating unit, including a dynamo electric machine and means for driving the same, and electric distribution mains, of a storage battery, a starting switch for the purpose of connecting the battery to the dynamo electric machine for starting purposes, and a connecting relay for connecting the dynamo electric machine direct to the distributing mains after it has attained a predetermined condition, substantially as described.

18. In an electric distribution system, the combination with a generating unit, including a dynamo electric machine and means for driving the same, and electric distribution mains, of a storage battery, a relay operable under the influence of a current flowing from the battery to the mains for starting purposes, and another relay operable under the influence of said current for the purpose of connecting a dynamo electric machine terminal to a distributing main, substantially as described.

19. In an electric distribution system, the combination with a generating unit, including a dynamo electric machine and means for driving the same, and electric distribution mains, of a storage battery, a starting relay, connections between the relay, battery, and dynamo electric machine, a coil in said relay operable under the influence of a local current flowing from the battery to the distributing mains, another relay, connections between a dynamo electric machine terminal and a distributing main, and a coil in said relay operable under the influence of current in the distributing main, substantially as described.

20. In an electric distribution system, the combination with a generating unit including a dynamo electric machine and means for driving the same, and electric distribution mains, of a source of electrical supply, a controlling relay, an actuating coil in said relay having a comparatively large number of turns, a holding coil in said relay having a comparatively small number of turns, connections for placing said coils in series with each other, a connection from the outer end of one of said coils to a distributing main, a connection from the outer end of the other coil to one terminal of the source of electrical supply, a connection from the other distributing main to one terminal of the dynamo electric machine, and a contact actuated by said relay for establishing a connection between the other distributing main and the other terminal of the dynamo electric machine, substantially as described.

21. In an electric distribution system, the combination with a generating unit including a dynamo electric machine and means for driving the same, and electric distribution mains, of a source of electrical supply, a controlling relay, an actuating coil in said relay having a comparatively large number of turns, a holding coil in said relay having a comparatively small number of turns, a connection for placing said coils in series with each other, a connection from the outer end of one of said coils to a distributing main, a connection from the outer end of the other of said coils to the source of electrical supply, a connection from one distributing main to one terminal of the dynamo electric machine, a switch actuated by said relay, and connections from the other terminal of the dynamo electric machine and from the connection between the two relay coils to said switch, substantially as described.

22. In an electric distribution system, the combination with a generating unit including a dynamo electric machine and means for driving the same, and electric distribution mains, of a storage battery, a controlling relay, an actuating coil in said relay having a comparatively large number of turns, a holding coil in said relay having a comparatively small number of turns, a connection for placing both of said coils in series, a connection from the outer end of the holding coil to one distribution main, a connection from the other distribution main to a terminal of the dynamo electric machine, a switch operable under the influence of the relay, a connection from the other terminal of the dynamo electric machine to the said switch, and a connection from the switch to the connection between the two relay coils, substantially as described.

23. In an electric distribution system, the combination with a generating unit including a dynamo electric machine and means for driving the same, and distribution mains, of a storage battery, a controlling relay, an actuating coil in said relay adapted to develop a lifting magneto motive force with a comparatively small current, a holding coil in said relay adapted to develop a holding magneto motive force with a comparatively large current, a connection for placing coils in series with each other, a connection from the outer end of the holding coil to a distribution main, a connection from the other distribution main to one terminal of the dynamo electric machine, a controlling switch operable under the influence of the controlling relay, a connection from the other terminal of the dynamo electric machine to said controlling switch, and a connection from said controlling switch to the connection between the two coils of the controlling relay, substantially as described.

24. In an electric distribution system, the combination with a generating unit including a dynamo electric machine and means for driving the same, and electric distribution mains, of a source of electrical supply, a starting relay, an actuating coil in said relay adapted to develop a lifting magneto motive force with a comparatively small current, a holding coil in said relay adapted to develop a holding magneto motive force with a comparatively large current, a connection for placing both of said coils in series with each other, a connection from the outer end of one of said coils to the source of electric supply, a connection from the outer end of the other of said coils to one distribution main, a connection from the other side of the source of electrical supply to the other distribution main and to a terminal of the dynamo electric machine, a switch operable under the influence of said relay, a connection from said switch to the connection between the two relay coils, and a connection from said switch to the other terminal of the dynamo electric machine, substantially as described.

25. In an electric distribution system, the combination with a generating unit including a dynamo electric machine and means for driving the same, and electric distribution mains, of a storage battery, a starting relay, an actuating coil in said relay adapted to develop a lifting magneto motive force with a comparatively small current, a holding coil in said relay adapted to develop a holding magneto motive force with a comparatively large current, a connection for placing both of said coils in series with each other, a connection from the outer end of the holding coil to one terminal of the storage battery, a connection from the outer terminal of the actuating coil to a distribution main, a connection from the other terminal of the storage battery to the other distribution main and to a terminal of the dynamo electric machine, a switch operable under the influence of said relay, a connection from said switch to the connection between both of said coils, and a connection from said switch to the other terminal of the dynamo electric machine, the actuating coil of said relay serving to limit the value of a recharging current flowing from the dynamo electric machine to the storage battery, substantially as described.

26. In an electric distribution system, the combination with a generating unit including a dynamo electric machine and means for driving the same, and electric distribution mains, of a source of electrical supply, a starting relay, a lifting coil and a holding coil in said relay, a connection for placing said coils in series with each other, a connection from the outer end of one of said coils to the source of electrical supply, a connection from the outer end of the other coil to a distribution main, a connection from the source of electrical supply to a distribution main and to one terminal of the dynamo electric machine, a switch operable under the influence of said relay, a connection from said switch to one terminal of the dynamo electric machine, and a connection from said switch to the connection between the two coils, whereby when a circuit is closed between the distribution mains current flows from the source of electrical supply through a circuit including both of the coils and both of the distribution mains to thereby cause the starting relay to actuate said switch, and whereby when the dynamo electric machine attains normal condition its electromotive force opposes that of the source of electrical supply to thereby reduce the current flowing through the coils of the relay until said coils are deënergized to allow said switch to open.

27. In an electric distribution system, the combination with a generating unit including a dynamo electric machine, and means for driving the same, and electric distribution mains, of a source of electrical supply, a controlling relay, an actuating coil in said relay, a connection from one end of said actuating coil to a distribution main, a connection from the other end of said actuating coil to the source of electrical supply, a connection from the source of electrical supply to one terminal of the dynamo electric machine, a switch operable under the influence of the controlling relay, a connection from said switch to the other terminal of the dynamo electric machine, a connection from said switch to the first mentioned distribution main, an ignition device for the dynamo electric machine driving means, a contact operable under the influence of said relay to make contact with one terminal of the dynamo electric machine, a connection from said contact device to the ignition device, and a connection from the ignition device to the other terminal of the dynamo electric machine, substantially as described.

LEE B. JONES.

Witnesses:
H. A. JENNER,
W. R. JAMES.